(12) United States Patent
Denny

(10) Patent No.: US 10,834,902 B2
(45) Date of Patent: Nov. 17, 2020

(54) PET LEASH HANDLE WRAP AND RELATED METHODS

(71) Applicant: Patricia A. Denny, Pittsburgh, PA (US)

(72) Inventor: Patricia A. Denny, Pittsburgh, PA (US)

( * ) Notice: Subject to any disclaimer, the term of this patent is extended or adjusted under 35 U.S.C. 154(b) by 168 days.

(21) Appl. No.: 16/103,530

(22) Filed: Aug. 14, 2018

(65) Prior Publication Data

US 2019/0045749 A1    Feb. 14, 2019

Related U.S. Application Data

(60) Provisional application No. 62/544,969, filed on Aug. 14, 2017.

(51) Int. Cl.
*A01K 27/00* (2006.01)

(52) U.S. Cl.
CPC .................. *A01K 27/003* (2013.01)

(58) Field of Classification Search
CPC .................. A01K 27/003; A01K 27/004
USPC .................. 119/770, 857, 791, 795, 769
See application file for complete search history.

(56) References Cited

U.S. PATENT DOCUMENTS

| 3,783,835 | A | * | 1/1974 | Kepirq | A01K 27/003 119/795 |
|---|---|---|---|---|---|
| 4,384,548 | A | * | 5/1983 | Cohn | A01K 27/007 119/792 |
| D339,885 | S | * | 9/1993 | Rebek | D30/153 |
| 5,867,868 | A | * | 2/1999 | Ward | A63B 49/08 16/422 |
| 6,082,308 | A | * | 7/2000 | Walter | A01K 27/003 119/769 |
| 6,553,944 | B1 | * | 4/2003 | Allen | A01K 27/00 119/769 |
| 8,322,311 | B2 | * | 12/2012 | Gould | A01K 27/00 119/792 |
| D731,715 | S | * | 6/2015 | Rissanen | D30/153 |
| 9,232,771 | B2 | * | 1/2016 | Lewis | A01K 27/003 |
| D762,927 | S | * | 8/2016 | Perryman | D30/153 |
| 2004/0062906 | A1 | * | 4/2004 | Kruger | F21V 21/0816 428/99 |
| 2013/0333632 | A1 | * | 12/2013 | Osher | A01K 27/006 119/792 |

* cited by examiner

*Primary Examiner* — Michael McCullough
(74) *Attorney, Agent, or Firm* — Gary P. Topolosky

(57) ABSTRACT

An animal leash handle wrap comprises a wrap component made in two halves, each half having a lower leash tunnel portion and an upper handle wraparound wing portion. The latter includes a pair of hook-and-loop fastener (i.e., Velcro®) strips on opposed sides and at opposite ends for looping about an existing leash handle and reconnecting to itself. The two tunnel portions are joined together, preferably by sewing, to form the tunnel/track through which a leash clasp/hook is fed when installing onto an existing pet leash. Methods for making and using this handle wrap are also disclosed.

2 Claims, 5 Drawing Sheets

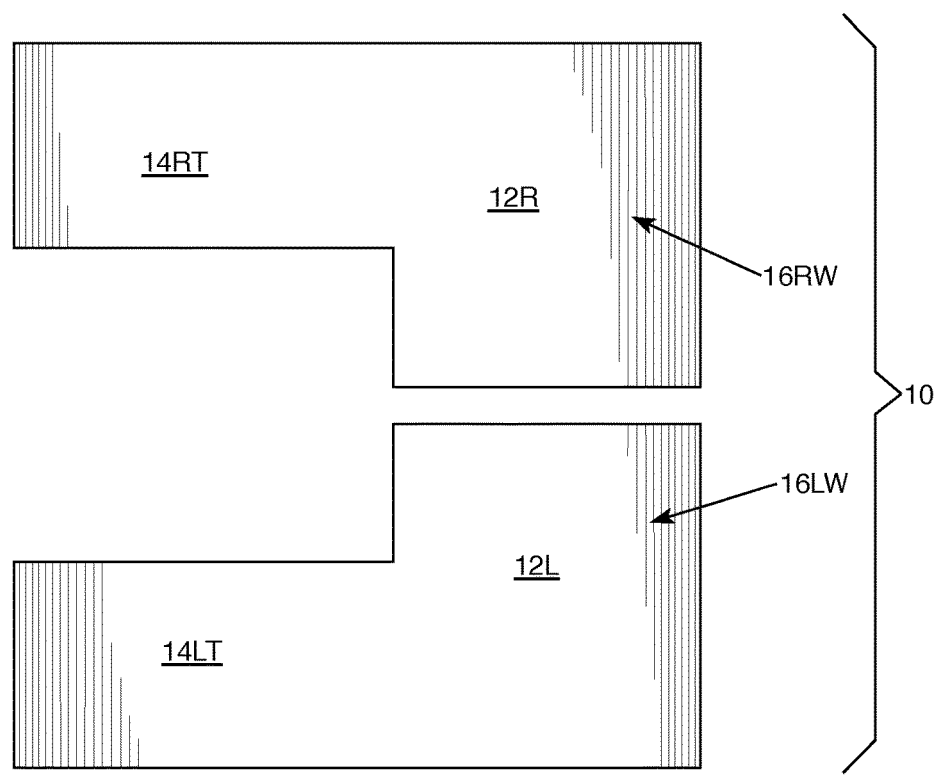
FIG. 1
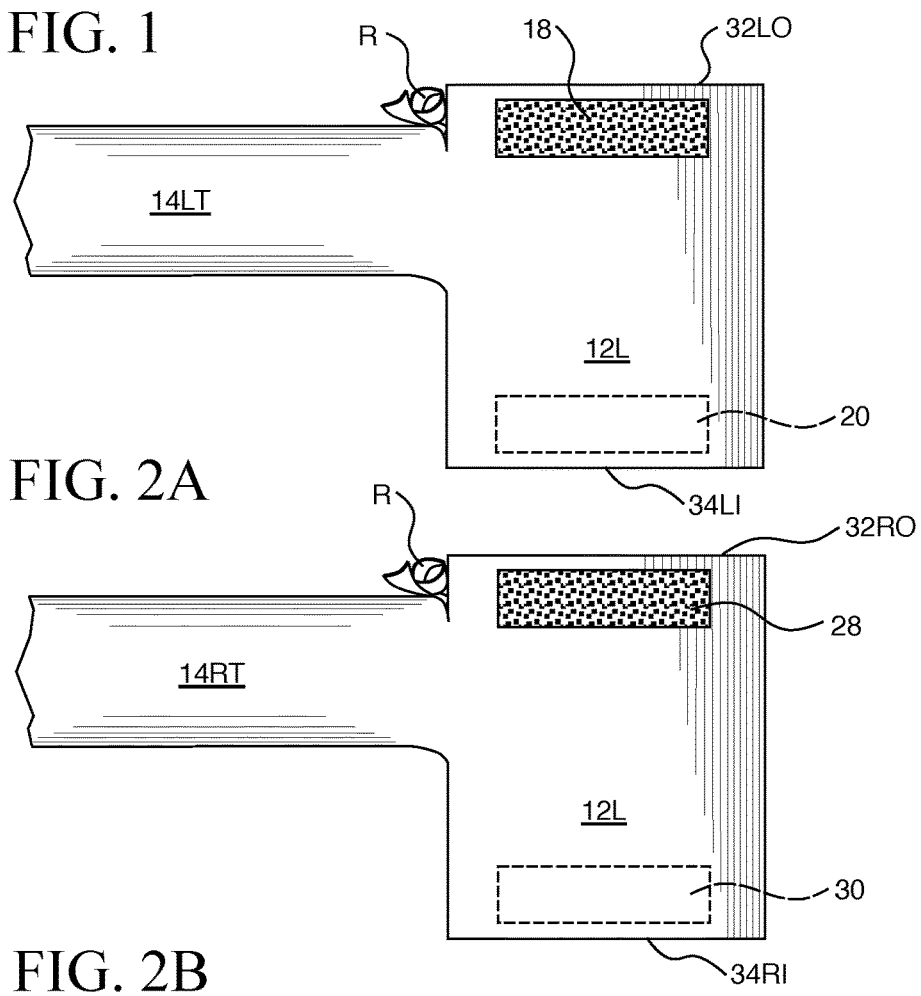
FIG. 2A
FIG. 2B

PET LEASH HANDLE WRAP AND RELATED METHODS

CROSS-REFERENCE TO RELATED APPLICATION

This is a perfection of U.S. Provisional Application Ser. No. 62/544,969, filed Aug. 14, 2017, the disclosure of which is fully incorporated by reference herein.

FIELD OF THE INVENTION

This invention relates to pet or dog walking leashes. More particularly, it relates to a comfortable wrap-around for the upper handle end of an existing pet leash. It also relates to a method for making such a leash handle wrap and a method for installing one about an existing pet leash. This device is currently being made and sold under the Federally registered trademark HOUND HANDLER® at www.houndhandler.com.

BACKGROUND OF THE INVENTION

A conventional leash or lead is a line attached to the neck of a pet (often a dog) for restraint or control. Some leashes clip or tie to collars or harnesses, while others go directly around the animal's neck. A properly handled leash restrains the animal to prevent them from frightening or biting people or other animals, wandering into traffic and getting lost.

A common type of leash is comprised of nylon webbing, usually 6 to 9 feet, with a looped webbing handle at one end and a clip at the other end. While such leashes provide considerable control over an animal, they do little to relieve the stresses experienced as an animal jerks on the leash. Dogs frequently pull abruptly on a leash with considerable force in an effort to run or play or to chase a vehicle or another animal. The leash transmits the pulling force to the handler's hand, wrist and/or arm, causing considerable discomfort.

There are several leash inventions known in the art. They include, in chronological order: Lawrence U.S. Pat. No. 6,371,055, Edwards U.S. Published Application No. 2006/0272595, Glazer U.S. Published Application No. 2008/0141950, LaCross U.S. Published Application No. 2008/0216769, Hajianpour U.S. Pat. No. 8,104,145 and Blakemore U.S. Pat. No. 8,393,302.

Numerous cushioning devices (or wraps) are also known for specific end uses. They include: Norman U.S. Pat. No. 4,262,385, Hildebrandt U.S. Pat. No. 5,511,445, Ward U.S. Pat. No. 5,867,868, Battiato U.S. Pat. No. 6,006,403, Bean U.S. Pat. No. 6,279,168, Beckwith U.S. Pat. No. 6,796,002, Holms U.S. Published Application No. 2005/0177983, Lehtonen U.S. Published Application No. 2014/0302287 and Bronk Schwab U.S. Design Pat. No. D767,317 to name a few.

What is needed is a handle wrap for easily installing about one's own "favorite" dog walking leash for cushioning the wearer's hand inserted into that handle wrap to better protect him/her from injuries/strains to the hand, wrist and lower arm especially those caused by the dog tugging for too long, too hard or quite unexpectedly. This invention is directed to overcoming one or more of the problems and solving one or more of the needs as set forth above.

SUMMARY OF THE INVENTION

To solve one or more of the problems above, in an exemplary implementation of the invention, a leash having a comfortable handle wrap that can be gripped or otherwise used as an upper wrist protector. Thus, a handler may exercise control, such as by resisting or pulling in an animal, without suffering appreciable discomfort to his/her hand, wrist or arm.

One exemplary animal leash handle wrap according to this invention includes a wrap component made in two halves that are mirror images of one another. Each half has a lower leash tunnel portion and an upper handle wrap-around wing portion. The latter has a pair of hook-and-loop fastener (i.e., VELCRO®) strips on opposed sides, at opposite ends, in order to loop about an existing leash handle before reconnecting to itself. The two tunnel portions of the two halves are first joined together, preferably by sewing, to form the tunnel (or track) through which the leash clasp/hook is fed when first installing the wrap about an existing pet leash. Alternately, these two tunnel portions may be fitted with snaps, a zipper, or matching VELCRO strips for just temporarily securing about the upper pet leash strap nearest its handle.

The aforementioned wrap is preferably made from a cushioned material, soft "pleather", naugahyde, faux fur, or padded cloth. More upscale versions may be made from actual leather or fur materials.

The method of making these wraps entails joining the two tunnel halves together, and adding connector strips (i.e., VELCRO) to the opposed ends & sides of the two wing portions for eventual joinder to themselves (AFTER being wrapped about the handle portion of an existing pet leash. Installation steps include: providing such a wrap as described hereinabove, threading the clip end of a leash through the connected tunnel end and then wrapping both handle halves about the left and right sides of the leash handle. Alternately, if the wrap is made even more "universal", i.e., without a pre-connected lower tunnel portion, the latter installation method may instead entail a first step of connecting the two lower tunnel halves together (with buckles, snaps, a zipper, VELCRO®, etc.) about the uppermost end of the leash, nearest its handle, before proceeding with the installation of the two wrap around leash handle components.

BRIEF DESCRIPTION OF THE DRAWINGS

The foregoing and other aspects, objects, features and advantages of the invention will become better understood with reference to the following description, appended claims, and accompanying drawings in which:

FIG. 1 is a top plan view of the two main halves/components to this leash handle wrap before connecting hook-and-loop fastener (or VELCRO®) strips are added thereto and the lower portions of both wrap halves joined (sewn) together;

FIGS. 2A and B are top plan views of the left and right upper handle wrap halves, respectively, with their lower tunnel portions joined together (to the left, in both views) and their respective VELCRO strip sections shown for eventual joinder about an existing pet walking leash handle;

Those skilled in the art will appreciate that the pictures are not intended to be limiting the invention to any particular scale in size; nor are they intended to illustrate every embodiment of the invention. This invention is not limited to the exemplary embodiments depicted in these drawings or the types of components, colors, shapes, relative sizes, ornamental aspects or proportions shown therein.

DESCRIPTION OF PREFERRED EMBODIMENTS

A representative, pre-existing pet leash L according to this invention includes an elongate strap section S (nylon, leather, cloth, or the like) having a distal end and a proximal end, a handle H adjoining the proximal end and a clip of some sort (for connecting to the pet's collar and/or harness) adjoining the distal end of the strap. This invention is not limited to any particular style of leash and/or means for coupling it to the animal.

Figure 3:
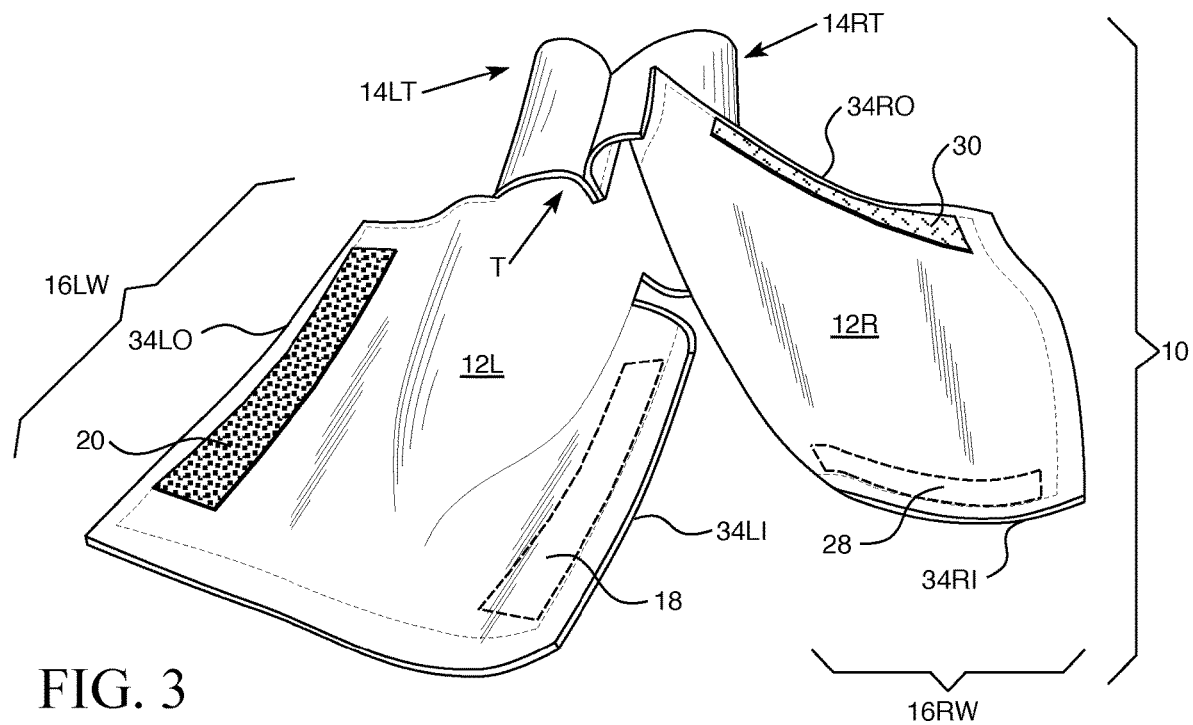
FIG. 3 is a top perspective view looking axially down the tunnel created by joining the lower portions of this wrap to each other, said tunnel being that portion of this invention through which an existing pet leash is first fed or threaded.
Figure 4:
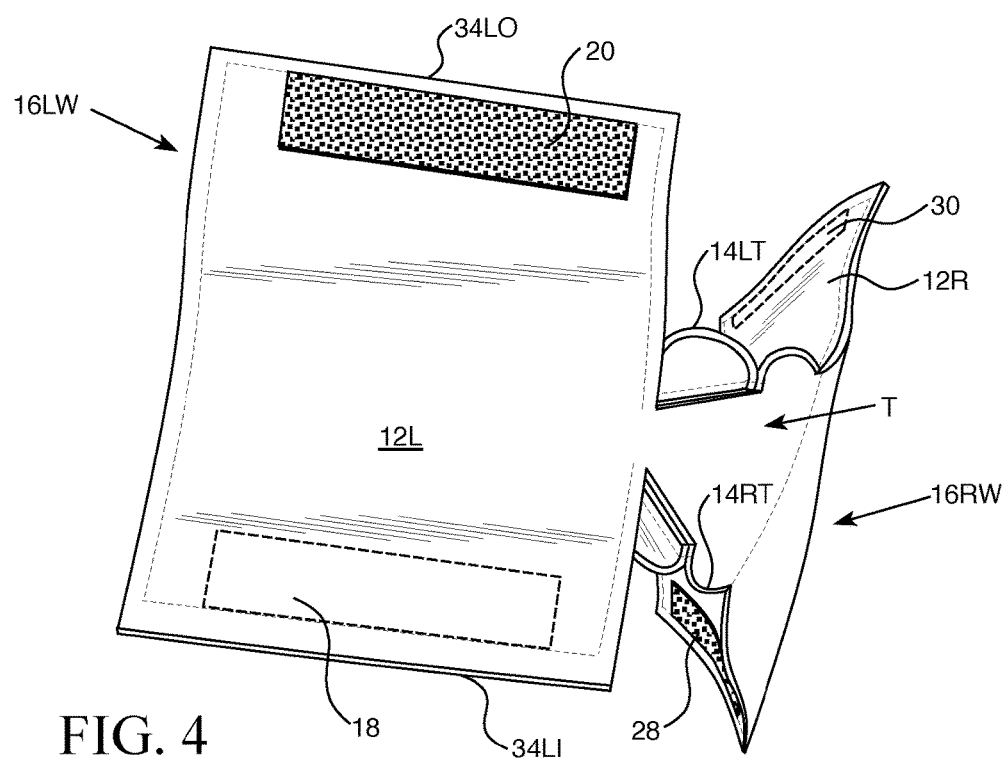
FIG. 4 is another top perspective view showing one of the two main handle wrap flaps with the tunnel for this invention extending axially adjacent this left wrap flap.
Figure 5:
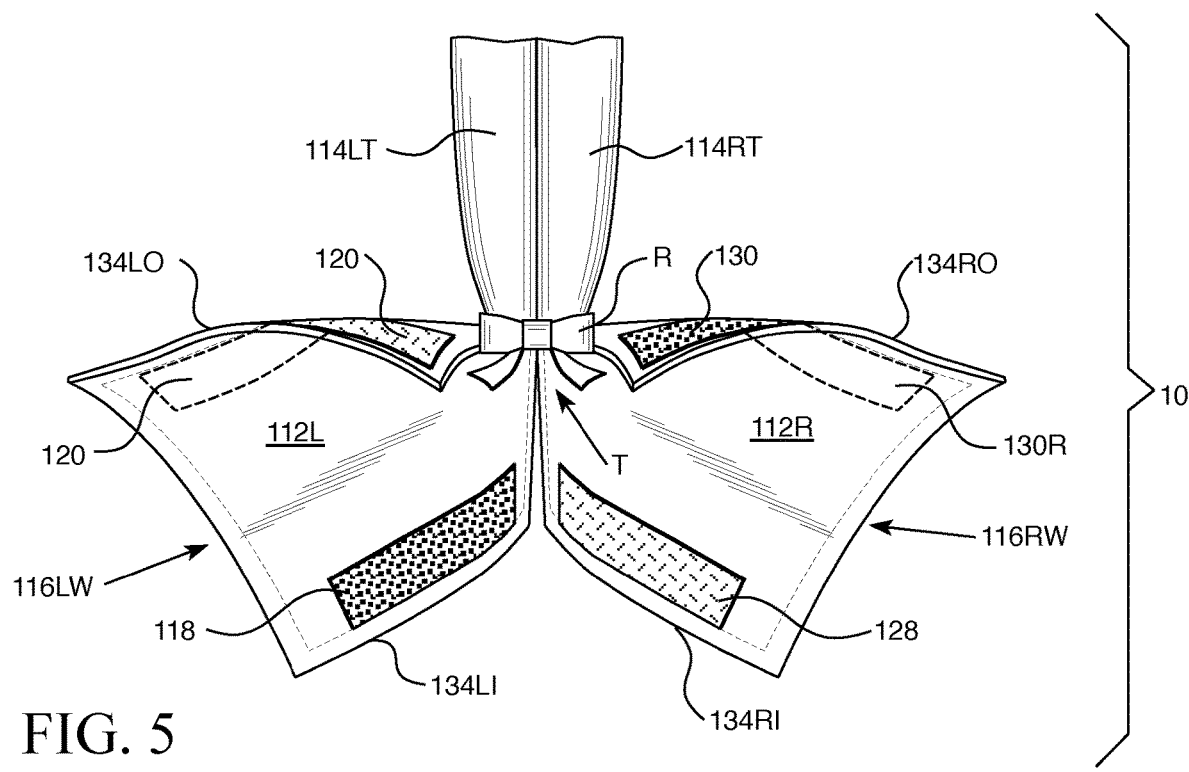
FIG. 5 is a top plan view of an alternative embodiment that shows the assembled tunnel portion (at the top, in this view) with the pair of handle wrap flaps opened on opposed side of this tunnel portion, this alternative view having its pair of VELCRO strips attached to the wrap flaps in a different manner from that shown in FIGS. 3 and 4.
Figure 6:
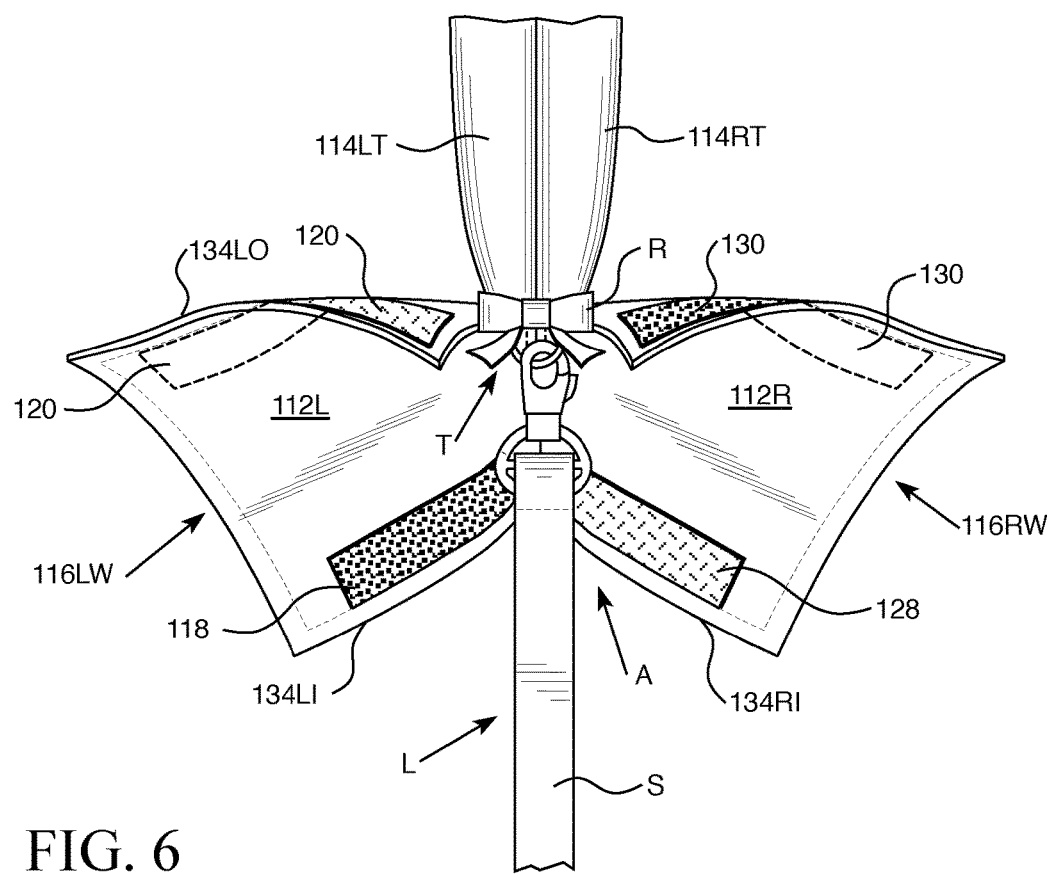
FIG. 6 is a top perspective view of the alternative embodiment from FIG. 5 showing an existing pet leash about to be fed, by its dog collar clip end, into the upper aperture of the joined tunnel component to this leash wrap handle.

In the accompanying FIGS., two representative versions of this invention are shown: those from FIGS. 3-4 and 7-11 (version 1) and a first alternative VELCRO mounting arrangement from FIGS. 5 and 6. Common elements for the second version are commonly numbered to the first, though in the next hundred series. It is to be understood, however, that still other handle wrap connections are anticipated by this disclosure besides the two side-to-side (inside to outside) versions shown. For instance, the handle wrap halves may also be joined about the leash handle halves in a top-to-bottom manner, and/or with snaps, zippers or other joinder means.

Referring now to the accompanying FIGS, various views of a handle wrap, generally 10, are shown starting with the two main elemental "halves" 12L (for the left half) and 12R for the right half (mirrored equivalent). Each half has its own lower tunnel portion 14LT, 14RT (which, when joined together by sewing or other joinder means, form a leash tunnel portion T) and its own upper handle wrap wing portion 16LW, 16RW. Each of the latter upper handle wrap wing portions includes its own pair (or two sections of matching (or mated) hook-and-loop fastener (i.e., VELCRO®) strips 18, 20 for the left upper wrap wing portion 16LW, and elements 28, 30 for the other, or right upper wrap wing portion 16RW. More specifically, for each upper wrap wing portion, a first section of VELCRO strip 18, 28 adheres at or near a first outer edge 32LO, 32RO of the respective wing portions 16LW, 16RW while its matching (mated) half section of VELCRO 20, 30 is affixed to the respective inner edges 34LI, 34RI, or at the opposite end of the respective wing portion half/pairs.

FIGS. 5 and 6 show a first alternative with different placement of the VELCRO strips 118, 120, 128, and 130 on the respective wing wraps 116LW and 116RW, adjacent (or directly below in these views) tunnel components 114LT and 114RT.

Figure 7:
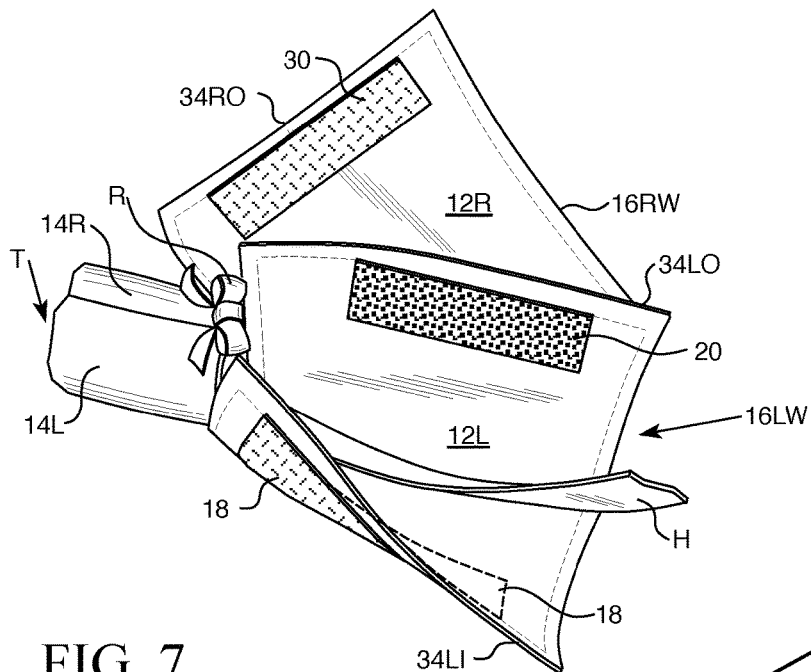
FIG. 7 is a top plan view of the first embodiment from FIGS. 3 and 4, showing a first wrap flap being situated about a pet leash handle before the two strips of VELCRO are joined about that side (or half) of the leash handle.
Figure 8:
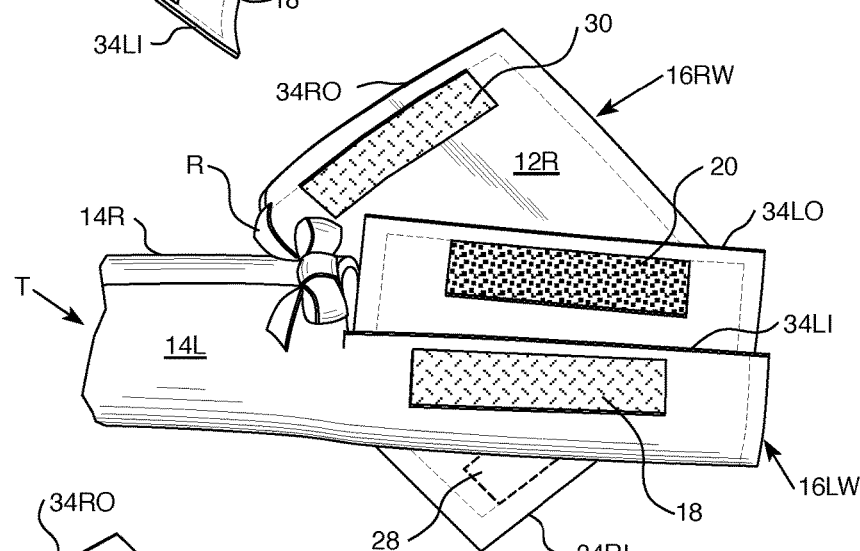
FIG. 8 is a top view of the lower VELCRO wrap flap from FIG. 7 brought fully over the leash handle before joinder to its matching VELCRO other half (either the hook OR loop half)
Figure 9:
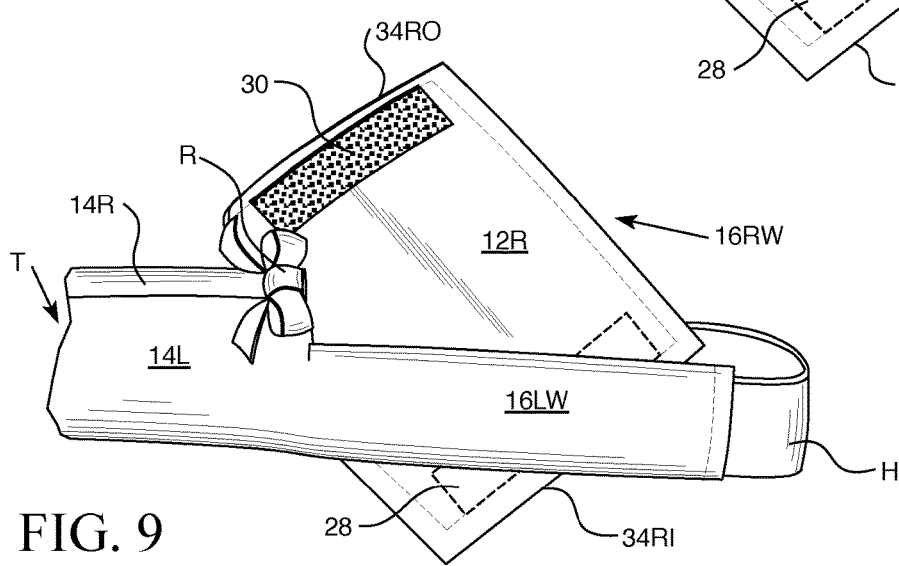
FIG. 9 is a top view of the VELCRO wrap flap from FIG. 8 fully joined about the one (left, as shown) side of the leash handle installed therein (note, the leash includes a purple, bone-shaped dog dropping bag holder to the far right)
Figure 10:
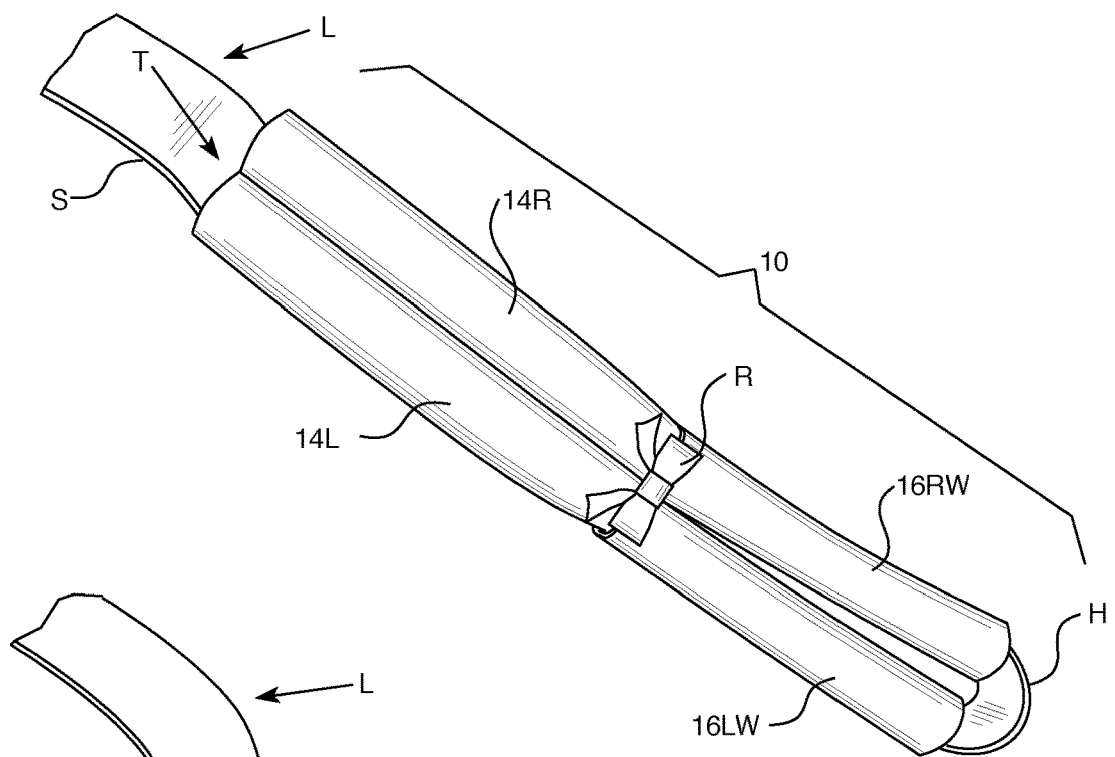
FIG. 10 is a top plan view of the first embodiment of this invention fully installed over an existing pet leash.
Figure 11:
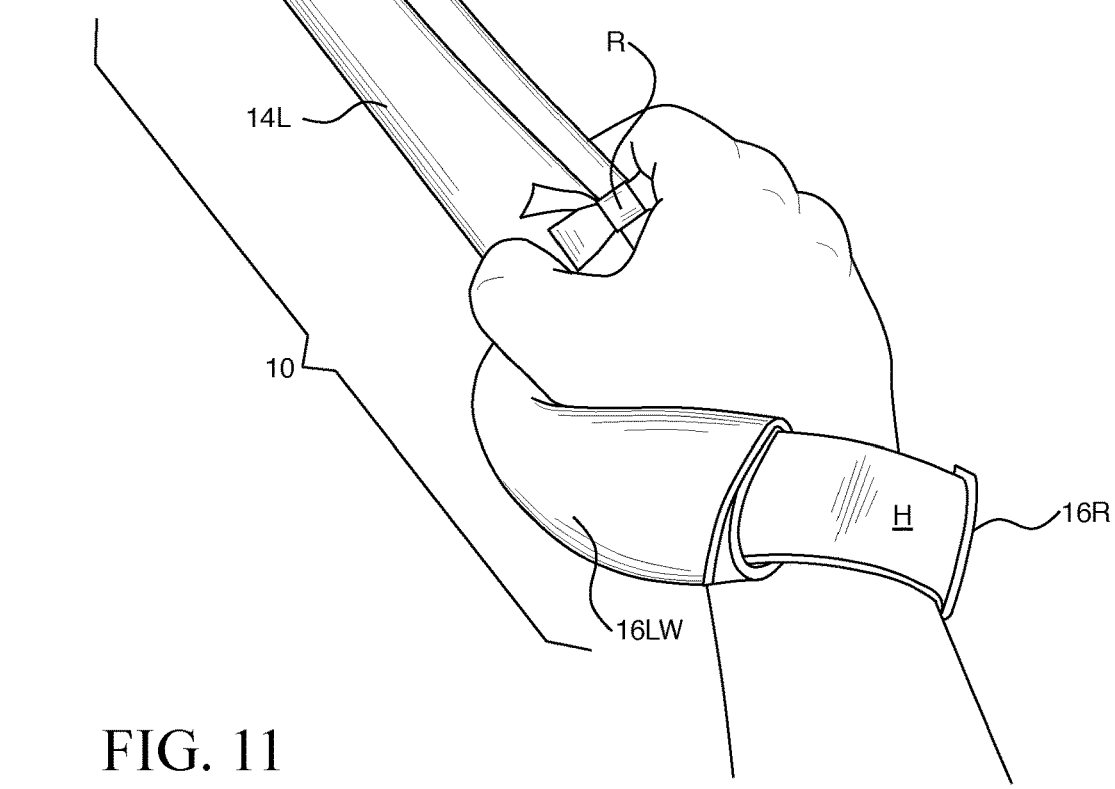
FIG. 11 is a top perspective view of FIG. 10 showing a pet walker's hand inserted up to the wrist holding the tunnel joinder portion of this invention for walking a pet therewith.

FIGS. 7 through 9 illustrate one version of installing the wing wraps 16LW and 16 RW about the handle H of an existing pet leash. FIGS. 10 and 11 show the fully installed device 10 with the strap S of leash L extending into the tunnel T and the two wing wraps 16LW and 16RW wrapped about the handle H of this same existing leash L.

While the invention is not limited to any particular type of material, the wrap should be made from a strong, durable, heavily cushioned fabric or webbing, dimensioned for encircling a fist, wrist and/or arm and configured for gripping. Cushioning may be provided by a soft flexible material such as neoprene, the DuPont Performance Elastomers trade name for synthetic rubber based on polychloroprene (polymer form of chloroprene). The voids, springy consistency, lightweight and chemical inertness of neoprene make it an ideal candidate for cushioning.

A releasable fastener, such as hook and loop straps (i.e., VELCRO®), is preferred for wrapping about both "halves", i.e. the left AND right side of a typical pet leash handle. A typical hook and loop fastener includes two layers: a "hook" side, which is a piece of fabric covered with tiny plastic hooks, and a "loop" side, which is covered with smaller and "hairier" plastic loops. Variations to this configuration may include hooks and loops on both layers, for example. When the layers are pressed together, the hooks catch in the loops and hold the pieces together. The strength of the hook and loop bond depends on how well the hooks are embedded in the loops and the nature of the force pulling it apart. In an exemplary embodiment, the bond is strong enough to withstand any force exerted by an animal, which is spread evenly across all hooks. However, because the layers are flexible, they can still be easily pulled apart with a peeling action that applies the force to relatively few hooks at a time.

In use, a cushioned handle with the wrap of this invention will be a welcome addition to most any standard walking lead or leash. Because the handle will be duly cushioned, tugging by an animal will not cause the wrapped portion of the lead to strangle the handler's wrist or hand and cause great discomfort.

As yet another alternative, the handle wrap of this invention may be supplemented with one or more phosphorescent strips/additives, like luminescent ribbon R, for providing the walker/user with some added late night visibility via its glow-in-the-dark capabilities.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. A method for installing a cushion handle wrap onto an existing pet leash comprises:
   (a) providing a handle wrap comprised of pair of wrap halves, each half having a lower tunnel portion that is joined to one another and an upper handle wing wrap portion that has means for adhering to itself after being wrapped about a handle end of the existing pet leash;
   (b) inserting a clip end of the existing pet leash into and through the lower tunnel portions of the handle wrap;
   (c) wrapping a first wing wrap portion about a first side of the existing pet leash handle;
   (d) connecting the first wing wrap portion to itself thereafter;
   (e) wrapping a second wing wrap portion about a second side of the existing pet leash handle; and
   (f) connecting the second wing wrap portion to itself.

2. The method of claim 1 wherein the handle wrap is made from a cushiony material selected from the group consisting of pleather, naugahyde, faux fur, leather and fur.

\* \* \* \* \*